(12) United States Patent
Whaley et al.

(10) Patent No.: US 9,038,064 B2
(45) Date of Patent: May 19, 2015

(54) TRACE ASSISTED PREFETCHING OF VIRTUAL MACHINES IN A DISTRIBUTED SYSTEM

(75) Inventors: John C. Whaley, San Mateo, CA (US); Wen-Suk Chun, Manhasset, NY (US); Monica Sin-Ling Lam, Menlo Park, CA (US); Constantine P. Sapuntzakis, Mountain View, CA (US)

(73) Assignee: Moka5, Inc., Redwood City, CA (US)

( * ) Notice: Subject to any disclaimer, the term of this patent is extended or adjusted under 35 U.S.C. 154(b) by 27 days.

(21) Appl. No.: 13/306,037

(22) Filed: Nov. 29, 2011

(65) Prior Publication Data
US 2012/0072911 A1  Mar. 22, 2012

Related U.S. Application Data

(62) Division of application No. 12/100,238, filed on Apr. 9, 2008, now Pat. No. 8,087,017.

(60) Provisional application No. 60/910,771, filed on Apr. 9, 2007.

(51) Int. Cl.
*G06F 9/455* (2006.01)
*H04L 9/32* (2006.01)
*G06F 21/00* (2013.01)
*G06F 21/64* (2013.01)
*G06F 21/53* (2013.01)

(52) U.S. Cl.
CPC .............. *G06F 21/64* (2013.01); *G06F 21/53* (2013.01)

(58) Field of Classification Search
CPC . G06F 9/5077; G06F 9/45377; G06F 3/0643; G11B 20/00021; G11B 20/00224; G11B 20/00217
See application file for complete search history.

(56) References Cited

U.S. PATENT DOCUMENTS

| 5,127,094 | A | 6/1992 | Bono |
| 5,757,919 | A | 5/1998 | Herbert |
| 5,920,896 | A * | 7/1999 | Grimsrud et al. ............. 711/165 |
| 6,202,121 | B1 * | 3/2001 | Walsh et al. .................. 711/100 |
| 6,317,875 | B1 * | 11/2001 | Grimsrud et al. ............. 717/174 |
| 6,681,391 | B1 | 1/2004 | Marino |
| 6,802,006 | B1 | 10/2004 | Bodrov |
| 6,952,797 | B1 * | 10/2005 | Kahn et al. .................... 714/770 |
| 7,275,150 | B2 | 9/2007 | Pagan |
| 7,415,653 | B1 * | 8/2008 | Bonwick et al. .............. 714/763 |

(Continued)

OTHER PUBLICATIONS

Brian Rogers et al:, "Using Address Independent Seed Encryption and Bonsai Merkle Trees to Make Secure Processors OS and Performance-Friendly." Microarchitecture, 2007. Micro 2007. 40.sup.th, Annual IEEE/ACM International Symposium, on, IEEE, Piscataway, NJ, USA, Dec. 1, 2007, pp. 183-196, XP031194141.*

(Continued)

*Primary Examiner* — Lewis A Bullock, Jr.
*Assistant Examiner* — Kevin X Lu
(74) *Attorney, Agent, or Firm* — Park, Vaughan, Fleming & Dowler LLP (57) ABSTRACT

The disclosed implementations are related to trace-assisted prefetching of a virtual machine from a network resource to improve interactive performance of the virtual machine on a host device. Trace patterns can be automatically uploaded to a network resource, which aggregates the patterns, and serves the patterns back to the host device, or a different host device, when the host device downloads a virtual machine for the first time.

2 Claims, 7 Drawing Sheets

(56) References Cited

U.S. PATENT DOCUMENTS

| | | | |
|---|---|---|---|
| 7,607,000 B1 | 10/2009 | Smith | |
| 7,836,379 B1* | 11/2010 | Ricci et al. | 714/770 |
| 7,917,956 B2* | 3/2011 | Jung et al. | 726/24 |
| 8,073,926 B2* | 12/2011 | Traut et al. | 709/203 |
| 2004/0153746 A1* | 8/2004 | Talagala et al. | 714/8 |
| 2005/0198517 A1* | 9/2005 | Ivanov et al. | 713/187 |
| 2006/0155735 A1* | 7/2006 | Traut et al. | 707/101 |
| 2007/0094348 A1* | 4/2007 | Scheidel et al. | 709/217 |
| 2008/0082812 A1* | 4/2008 | Kirshenbaum et al. | 713/2 |
| 2011/0191753 A1* | 8/2011 | Ghercioiu et al. | 717/132 |
| 2012/0005467 A1* | 1/2012 | Butler et al. | 713/2 |

OTHER PUBLICATIONS

Adya et al., FARSITE: Federated, Available, and Reliable Storage for an Incompletely Trusted Environment, OSDI 2002, Dec. 2002.*

Garfinkel et al., "Terra: A Virtual Machine-Based Platform for Trusted Computing", SOSP'03, Oct. 19, 2003.*

Moore, ZFS: The Last Word in File Systems, www.cs.utexas.edu/users/dahlin/Classes/GradOS/papers/zfs_lc_preso.pdf, Nov. 18, 2005.*

Sapuntzakis, Constantine P. et al., "Optimizing the Migration of Virtual Computers", Computer Science department, Stanford University, 2002, Entire document.

* cited by examiner

TRACE ASSISTED PREFETCHING OF VIRTUAL MACHINES IN A DISTRIBUTED SYSTEM

RELATED APPLICATION

This application is a divisional application of, and claims priority to, U.S. application Ser. No. 12/100,238, having the same title and inventors, filed 9 Apr. 2008, which, in turn, claims the benefit of U.S. Provisional Patent Application No. 60/910,771, filed Apr. 9, 2007, which is incorporated herein by reference.

TECHNICAL FIELD

This subject matter is generally related to computers and operating systems.

BACKGROUND

Virtual machines are a useful way to encapsulate software environments. For example, a virtual machine can hold an operating system, applications, settings, and user data and settings. Using networks, software environments can be distributed by distributing virtual machines. Host devices can retrieve virtual machines from the network and run them to provide a user of the host device with a software environment. One of the challenges of distributing virtual machines is that virtual machines can take a long time to download from a network due to their large size.

An alternate approach is to start the virtual machine (VM) immediately and pull down the parts of the virtual machine as the virtual machine monitor (VMM) or guest operating system (OS) requests them. In many cases, this alternate approach, known as demand paging, allows the user to begin interacting with the virtual machine sooner than if they waited for the complete download. When the time to retrieve blocks from the server is higher than the time to retrieve blocks from the local disk, demand paging can lead to a virtual machine that is slower than a virtual machine that is fetched in its entirety. To hide this latency, demand paging can be supplemented by fetching blocks before they are requested by the virtual machine. This technique is called prefetching.

Prefetching requires a system to have excess capacity for the extra requests (e.g., pause times when the system can prefetch blocks). Effective prefetching also requires determining which blocks the virtual machine will request soon. One conventional method is to look at past request patterns and assume that future request patterns will be similar. For a new host device, however, there are no request patterns available.

Additionally, many virtual disk formats (e.g., Microsoft's VHD® and VMware's VMDK), allow blocks to be arranged in an order (e.g., an arbitrary order) within the actual file (or "disk file"), storing the virtual disk. This feature can be used to rearrange the blocks inside the disk file so that, for example, the blocks needed earlier by clients occur earlier in the file. By reading a sorted disk file sequentially, a client can fetch blocks according to a prefetch order. For digitally signed disks, reorganizing files creates a verification problem. For example, if a file is signed by one party and resorted by another, the integrity of the resorted file can become questionable, as an uncertainty can exist as to whether the signature of the file was maintained after the resorting.

SUMMARY

In general, in one aspect, a computer-implemented method is provided. The computer-implemented method includes determining an activity trace of a virtual machine; and automatically uploading the trace and the virtual machine to a network resource.

In another aspect, a second computer-implemented method is provided. The second computer-implemented method includes receiving an activity trace for a virtual machine; and using the trace to preferentially fetch parts of the virtual machine from a network resource.

In another aspect, a third computer implemented method is provided. The third computer implemented method includes receiving one or more virtual disks, each virtual disk being in a first version and including one or more blocks in a first order; receiving an activity trace; reading the activity trace in the order received; and applying the read order of the activity trace to the first version of a virtual disk to create a new version of the virtual disk, the new version of the virtual disk including one or more blocks in a new order.

In another aspect, a fourth computer implemented method is provided. The fourth computer implemented method includes receiving a virtual disk including a first page table block corresponding to one or more other page table blocks or one or more data blocks, where the one or more other page table blocks or the one or more data blocks are in a first order; generating a representation of the first page table block, where the representation of the first page table block includes presence information with respect to the one or more other page table blocks or the one or more data blocks in the virtual disk that are pointed to by the first page table block, and where the representation is position independent with respect to the one or more data blocks or one or more other page table blocks; and signing the representation of the first page table block, where signing the representation includes generating a signature for the first page table block.

Embodiments of this aspect can include apparatus, systems, and computer program products.

Implementations of the method, computer program product and system can optionally include one or more of the following features. The offset of the one or more other page table blocks or the one or more data blocks can be change such that the one or more other page table blocks or the one or more data blocks are in a new order. The first page table block including the signature for the first page table block can be received, the position-independent representation from the first page table block can be generated, and the signature and the generated position-independent representation can be used to verify the integrity of the first page table block, where the first page table block includes the presence information with respect to the one or more other page table blocks or the one or more data blocks in the virtual disk, pointed to by the first page table block, and in the new order. Each of the one or more other page table blocks and each of the one or more data blocks can be signed. Each page table block and each data block can have a corresponding virtual address, and a signature for a block can include the virtual address for the block inside the signature.

Particular embodiments of the subject matter described in this specification can be implemented to realize one or more of the following advantages. The disclosed implementations are related to trace-assisted prefetching of a virtual machine from a network resource to improve interactive performance of the virtual machine on a host device. Trace patterns can be automatically uploaded to a network resource, which aggregates the patterns, and serves the patterns back to the host device or a different host device when the host device downloads a virtual machine for the first time.

The details of one or more embodiments of the invention are set forth in the accompanying drawings and the descrip-

DETAILED DESCRIPTION

Figure 1:
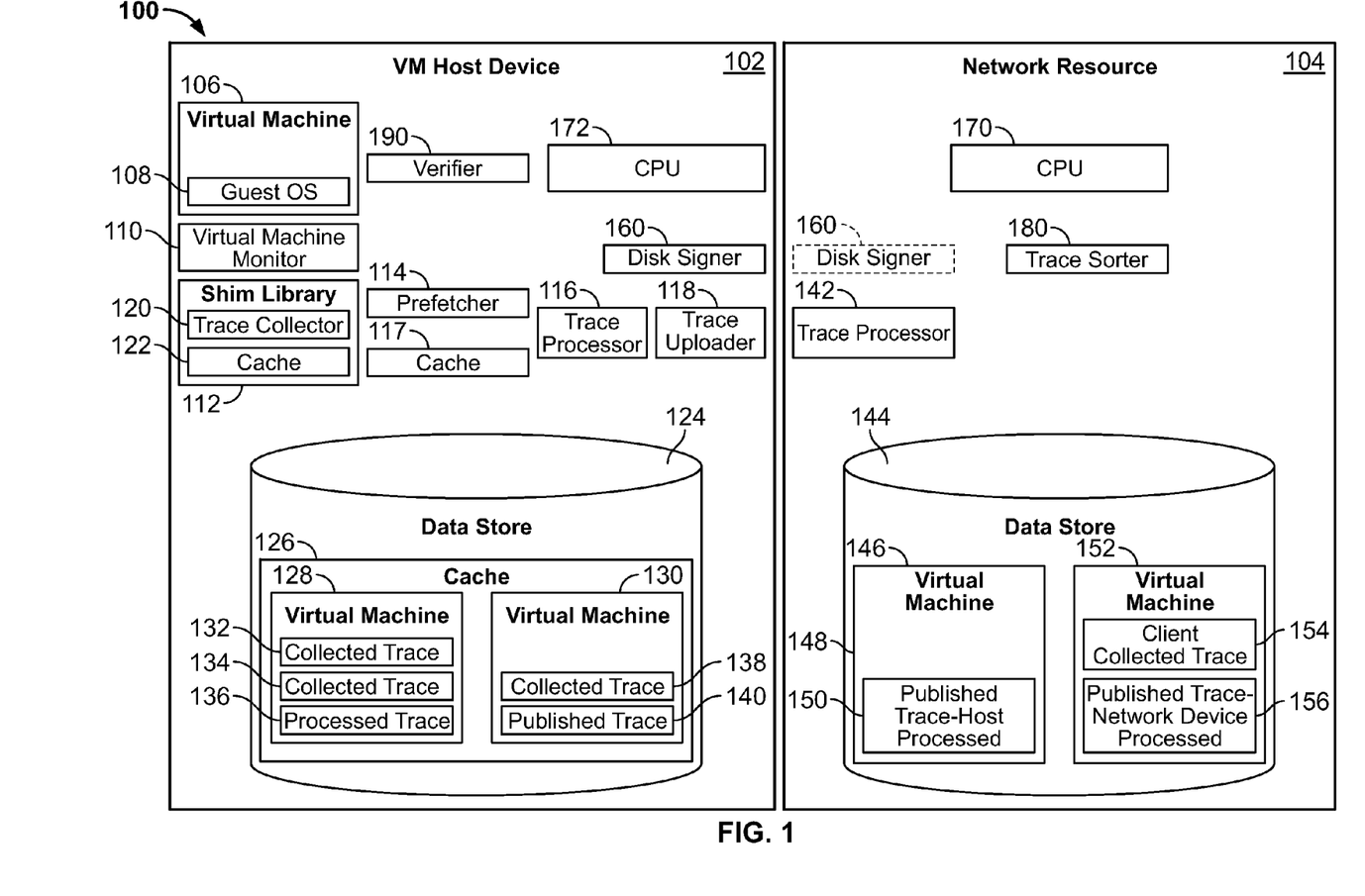
FIG. 1 is a block diagram of an example system for trace-assisted prefetching of virtual machines.

FIG. 1 is a block diagram of an example system 100 for trace-assisted prefetching of virtual machines. In some implementations, the system 100 can include a host device 102 and a network resource 104 coupled to a network (not shown). The system 100 is one possible configuration for implementing trace-assisted prefetching of virtual machines. Other configurations are possible having more or fewer components.

The host device 102 can be any device capable of hosting a virtual machine, including but not limited to: personal computers, mobile phones, media players/recorders, consumer electronic devices, game consoles, television set-top box, tablets, personal digital assistants (PDAs), media centers, navigation systems, email devices, storage media (e.g., USB flash drives), etc. The host device 102 can include a processor 172 (e.g., an x86 processor) and one or more user input devices (e.g., a keyboard, mouse, or touchpad). In some implementations, the processor 172 can be coupled to a peripheral interface and operable for running a native environment. The host device 102 can include a memory (e.g., coupled to the processor), for storing instructions which when executed by the processor cause the processor to perform certain operations (e.g., use a trace to preferentially fetch parts of a virtual machine from a network resource). In some implementations, the data store 124 in the host device 102 can also include an OS and a temporary directory.

In some implementations, the host device 102 can include a virtual machine 106 running a guest OS 108, a virtual machine monitor 110, a shim library 112, a prefetcher 114, a trace processor 116, a trace uploader 118, a disk signer 160, a verifier 190, and a data store 124. In some implementations, the host device 102 can include a trace sorter 180. The shim library 112 can include a trace collector 120 and a cache 122. The data store 124 can include a cache 126 for storing virtual machines 128 and 130. In the example shown, the data store 124 for virtual machine 128 can include collected traces 132, 134, and a processed trace 136. The data store 124 for virtual machine 130 can include collected trace 138 and a published trace 140. Virtual machines 128 and 130 are on-disk representations of virtual machines. Virtual machine 106 is the in-memory, running representation of a virtual machine.

In some implementations, the virtual machine 106 and the software to run the virtual machine 106 (e.g., a virtual machine monitor 110), can be pre-installed on the host device 102. In some implementations, platform software installed on the host device 102 can include components (e.g., code), capable of checking the host device 102 for host device characteristics and capabilities, and selecting additional virtual machines or available software from the network resource 104. Host device 102 and network resource 104 can include a network connection (e.g., DSL, cable, dialup, LAN, VPN, cellular, or WiFi), to enable features of the platform software (e.g., acquiring updates, acquiring remote user data, or exposing host device 102 functionalities to other devices accessible using the network connection). The network can be one or more networks having any desired topology, including but not limited to: the Internet, an intranet, wireless networks, optical networks, microwave networks, satellite networks, Ethernet, Wide Area Networks ("WAN"), Local Area Networks ("LAN"), and peer-to-peer (P2P) networks.

The network resource 104 can be any device with network connectivity and storage capacity, including but not limited to: server computers, databases, storage area networks (SANs), routers, hubs, datacenters, data stores, repositories, peer-to-peer network node, and wireless transceivers. In some implementations, the network resource 104 can include a CPU 170, a data store 144, a trace sorter 180 and optionally a trace processor 142, a verifier 190, and a disk signer 160. The data store 144 can include one or more virtual machines 146 and 152. A virtual machine can include one or more traces. For example, in data store 144, virtual machine 146 includes a published trace 150 which was processed on host device 102. In another example, in data store 144, virtual machine 152 includes a client collected trace 154 and a published trace 156 which was processed on network device 104.

In some implementations, the traces (e.g., 132, 134, 136, 138, and 140) reflect the activity of the guest OS 108 and any applications running on top of the guest OS 108. The format of the traces can be a list of blocks. The blocks may be expressed by block number or by a pair of numbers (e.g., offset, size). Traces can also include data in-line. In some implementations, the shim library 112 intercepts inputs and outputs (I/O) from the virtual machine monitor 110 to files of the virtual machine 106 (e.g. virtual machine files 128 or 130), and passes them (e.g., using a function call with arguments), to the trace collector 120 which records into a trace the files and blocks accessed, in the order they were requested by the VMM. In some implementations, the trace collector 120 can be coupled to a trace uploader 118.

In some implementations, the shim library 112 operates by intercepting calls from the virtual machine monitor 110 to the operating system (e.g., asking to read and write the on-storage representation (e.g., the files) of the virtual machine). In some implementations, these are calls to the file I/O Application Programming Interfaces (APIs) (e.g., Windows® CreateFile, ReadFile, WriteFile, CloseFile). The shim library 112 can be injected between the VMM 110 and the operating system using known shimming techniques (e.g., Import Address Table (IAT) patching, function entry-point rewriting, or application rewriting). In some implementations, the trace collector 120 can be integrated into the virtual machine monitor 110 and the I/O library functions (e.g., a disk library) can be modified to log accesses to on-storage representation (e.g., the files), of the virtual machine.

The trace uploader 118 can be operable to upload (e.g., automatically or upon user request), a trace to a network resource 104. In some implementations, the trace uploader 118 can run without user invention or with minimal user intervention. For example, the trace uploader 118 can run by prompting the user (e.g., by presenting a checkbox in the installer dialogs or in a dialog that occurs on first start), as to whether the user wishes to share traces. In some implementations, using application system preferences (e.g., via a checkbox in a GUI tool or command line option in a console tool), the user can set user preferences indicating whether or when the trace uploader 118 will run.

In some implementations, the traces (e.g., 132, 134, 136, 138, and 140), contain the addresses (e.g., the file name and offset) of blocks accessed. If the access is to a virtual disk that is part of a virtual machine (e.g., virtual machines 120 or 130), the blocks recorded in the trace can be translated to reflect the underlying blocks of the virtual disk file format. For example, the trace collector 120 learns by reading the header of a virtual disk file that the block size is a certain size (e.g., 64 kilobytes). The trace collector 120 can then discover the block boundaries by examining a page table. If an access falls within a block, the access start can be rounded to the beginning of the block, since the trace collector 120 knows where the blocks begin. Additionally, the size of the access can be rounded to the block size, since the trace collector 120 knows the size of the block. If an access spans multiple blocks, the access start can become the start of the block in which the first bytes of the access lies and the length can become the size of the blocks that the access spans. Additionally, instead of recording the access as file offset and size, the physical block number or numbers in the virtual disk file (e.g., a virtual disk file located on virtual machine 106), can be recorded (e.g., virtual disk files can be a sequence of physical blocks after an initial header).

In some implementations, the trace collector 120 can record at a sub-block granularity. For example, if a virtual disk file uses a 64 k block size, but the guest OS 108 or virtual machine 106 read just 2 kilobytes of the block, the trace would ordinarily record that the entire 64 k block of the virtual machine 106 was accessed. A trace collector 120 capable of recording at a finer (e.g., sub-block), granularity would record that only 2 kilobytes of the block had actually been accessed.

In some implementations, when a virtual machine 106, is published (e.g., so that it can be used by others), a trace collected from the most recent execution of the virtual machine 106 can be copied (e.g., automatically or by user-selection), to the network resource 104. In some implementations, a trace collected from the last run of the virtual machine 106 can be copied to the network resource 104 along with the virtual machine 106. In some implementations, blocks can be individually uploaded (e.g., to a virtual machine disk block service). In implementations where a whole disk file is uploaded, blocks can be individually shared (e.g., under protocols like HTTP), using a range request to grab a portion of a file (e.g., a single block).

In some implementations, the host device 102 can upload traces (e.g., by doing an HTTP POST to well-known URL in a virtual machine configuration file), for a virtual machine without creating and uploading a new version of the virtual machine. In these implementations, the host device 102 can collect information about runs of an existing virtual machine rather than collecting information of a new one.

Network resources (e.g., network servers), are generally configured to make virtual machine files available to authorized clients through network protocols (e.g., HTTP). Publishing a virtual machine places the files that constitute the virtual machine on a network resource (e.g., network resource 104). In some implementations, to publish a new VM or a new version of an existing VM, the files of a new VM or a new version of an existing VM can be uploaded to network resource 104 using a program that communicates (e.g., using File Transfer Protocol (FTP)), with the network resource 104.

As part of the upload, the program creates a new directory on the network resource 104 for the new VM or the new version of an existing VM. The uploaded new VM or new version of the existing VM can then be placed in the files corresponding to the new directory. In some implementations, one or more traces are stored on the network resource 104 (e.g., in the same directory as the virtual machine). In some implementations, a file with a well-known name can enumerate the names of one or more available traces. In some implementations, there is only one available trace and the one available trace is stored at a well-known name.

In some implementations, as part of the publishing process, an administrator can set access control parameters for a new VM (and the corresponding files), or a new version of an existing VM (and the corresponding files). Once access controls are set, authorized clients can access the files of published VMs (e.g., using the HTTP and GET requests, for example), to fetch the contents of the files constituting a new VM or a new version of an existing VM. Range requests can be used in HTTP to fetch portions of files (e.g., individual blocks of a virtual disk). In some implementations, the client program can use a network file system (NFS) protocol to access the files. In some implementations, the client can use HTTP basic authentication or cookies to authenticate a request.

Some implementations can be configured to be peer-to-peer implementations, where information is shared between machines locally (e.g., without uploading to a server). Thus, in these implementations, traces (and one or more portions of the file that represents the VM) can be fetched from other host devices running the virtual machine rather than from a server. For example, a tracker server can be implemented to monitor which host devices have fetched which parts of which VMs. When a new host device decides to run a VM, it can request (e.g., from the tracker server), a list of host devices that have previously fetched the one or more parts of the VM that the host device is interested in fetching. The new host device can then attempt to contact a host device from the list of host devices for traces and files.

In some implementations, while requesting the list of other host devices running the VM, a new host device can register itself with the tracker server (e.g., either automatically or by user-selection), as a source for files. In some implementations, the tracker server can provide a list of one or more other servers running the VM (e.g., in cases where few clients have previously fetched the VM). In some implementations, the trace data can be hosted on a server other than the server hosting the virtual machine. In those implementations, the server hosting the trace data can use a well-known name (e.g., a URL or URI), to identify the VM for which a trace is needed.

In some implementations, collected traces 132 and 134 are collected on different runs of the virtual machine. The trace processor 116 creates a processed trace 136 from collected traces 132 and 134. In some implementations, trace processor 116 can combine the traces and can sort the blocks (within the combined trace), from most frequently requested block to least frequently requested block. In some implementations, the trace processor 116 can remove overlapping and redundant accesses to the blocks in a trace before the trace is published. In some implementations, the trace processor 116 can truncate a trace after the trace has reached a certain size or number of bytes referenced.

In some implementations, as part of uploading (e.g., publishing) a new version of virtual machine 128 to the network resource 104, processed trace 136 can be copied (e.g., automatically or by user-selection), becoming published trace 150. In some implementations, the processed trace 136 can be copied using standard protocols (e.g., NFS or HTTP POST/PUT). An advantage of performing the trace processing at the host device 102 is that the need to install trace processor 142 on the network resource 104 is eliminated, and thus, the network resource 104 can be a simple storage server.

In some implementations, the host device 102 can download additional client collected traces 154 from the network resource 104. The host device 102 can then process the additional client collected traces 154 along with local collected traces 132 and 134 to create for example, processed trace 136. The host device 102 can then upload the processed trace 136 to network resource 104 where the processed trace 136 becomes published trace 150. In these implementations, the network resource 104 is able to maintain a simple state, while the host device 102 incorporates traces from multiple other host devices. In some implementations, the host device 102 can delete collected traces 132 and 143 after the host device 102 has created process trace 136. In some implementations, the collected traces 132 and 134 traces can be kept (e.g., until a new version of a virtual machine 128 is detected, until virtual machine 128 is deleted, or until the traces exceed a preset limit for trace storage).

In some implementations, the network resource 104 can run the trace processor 142. The trace processor 142 can create one or more published traces 156 from one or more client collected traces 154 collected at one or more host devices 102. The transformations that can be done by trace processor 142 on the client collected traces 154 include those that can be done by trace processor 116 at the host device 102. An advantage of performing the trace processing at the network resource 104 (e.g., as opposed to performing the trace processing in a host device 102), is that the network resource 104 can have local access to many traces from a variety of host devices 102. Additionally, the network resource 104 can locally write the published trace 156.

In one implementation, a processed trace 136 can be transformed such that the most frequently used blocks are at the front of the trace and the least frequently used blocks are at the back of the trace. As noted above, in some implementations, when the host device 102 fetches a virtual machine or a new version of an existing virtual machine, the host device 102 can also fetch any corresponding published traces 140. In some implementations, a published trace 140 can be just another file in the collection of files that make up a virtual machine (e.g., virtual machine 130). In some implementations, the prefetcher 114 on host device 102 can load the blocks listed in the published trace 140 into the local on-disk cache 126. In some implementations, the prefetcher 114 can scan the list of blocks in the published trace 140 in order and fetches (e.g., from a network resource 104), the blocks referenced in the trace to the host device 102.

In some implementations, before requesting a particular block from the network resource 104, the prefetcher 114 can use the cache module 117 to check the local cache 126 to make sure the particular block is not already present on the host device 102. Because the prefetcher 114 can be running concurrently with other programs accessing the virtual machine 130, in some implementations, the system 100 is operable to prevent the prefetcher 114 and the other programs from concurrently retrieving the same block. In some implementations, preventing the concurrent retrieving of the same block is accomplished using file locking techniques (e.g., Windows LockFileEx, UNIX flock), over a range representing the blocks being fetched. In these implementations, locking can be performed on a small lock file representing the object being fetched. Alternatively, in some implementations, (e.g., if the file locking can be advisory and the blocks are being fetched into a file), the file being written can be used for advisory range locks (e.g., POSIX fcntl locks).

In some implementations, one or more ranges of blocks can be locked using the cache modules 117 and 122. In some implementations, the cache modules 117 and 122 can be the same code module (e.g., static or dynamic library). In some implementations, cache modules 117 and 122 can be different code modules capable of working together.

In some implementations, the features of the shim library 112 can be built into the virtual machine monitor 110. In some implementations, a trace can be collected by a process running on the guest OS 108 and communicated to the trace collector 120 using a mechanism such as, for example, VMware Inc.'s Crosstalk®. In some implementations, the trace information can include information (e.g., an executable name), corresponding to the input or output generated by an application process or OS process. In some implementations, one or more traces can be used to prefetch blocks from cache 126 into fast memory (e.g., RAM), on host device 102.

In some implementations, when a particular block is requested, the network resource 104 can select and send additional extra blocks to the host device 102. The selecting and sending of the additional extra blocks to the host device 102 can be based on a trace 156 stored by the network resource 104. These implementations require that the host device 102 be able to differentiate between blocks returned in response to a host device 102 request and blocks volunteered by the network resource 104. In some implementations, this can be done by prepending a header to each block returned to the host device 102 indicating the offset and size of the following block. In some implementations, the host device 102 can reorder blocks in the local data store 124 (e.g., such that sequential blocks in a trace are located sequentially in the data store 124). In some implementations, the traces 132, 134, 136, 138, 140, 150, 154, 156, can be compressed when stored, sent, or received from the network resource 104 (e.g. by using a gzip library).

In some implementations, the cache 126 on the host device 102 can implement eviction on a block granularity. In those implementations, the host device 102 design can avoid evicting prefetched blocks from the cache 126 for a set amount of time or until the prefetched blocks can be used. In these implementations, the blocks can be marked as referenced as they are inserted into the cache 126. The system 100 can limit the amount of the cache 126 devoted to prefetched data (e.g., to avoid replacing blocks that are being actively used with blocks that may or may not be used). In some implementations, prefetching can be eliminated, for example, when the cache is about to evict a block (e.g., due to a fetch of new data), with an age below some threshold (e.g., determined by the designer of the cache 126). In those implementations, the age of the block can be based upon the amount of time that has passed since the block was last referenced.

In some implementations, the trace processors 116 or 142 can create a prediction matrix calculating a probability for each block (e.g., based on a prior event). In some implementations, the entries in the matrix can be based upon the collected traces and the probability that a second block appears after a first block within the collected traces. For example, the probability can be calculated by first counting the number of times the first block appears before the second block, and then dividing that number by the total number of times the second block occurs generally. In those implementations, unless it has already been fetched, a second block can be fetched (e.g., either automatically or upon user-request), after the first block has been fetched.

In some implementations, the prefetcher 114 can specify to the host OS that the I/O or network traffic of the prefetcher 114 should be a lower priority than other I/O or network traffic activity (e.g., SetPriorityClass in Microsoft® Windows). In some implementations, the prefetcher 114 can implement throttling to scale back the prefetcher 114 activity (e.g., when foreground network, disk, or processes are especially active). Network throttling can be done using, for example, TCP Nice, which is described in Venkataramani et al., "TCP Nice: A Mechanism for Background Transfers," Laboratory of Advanced Systems Research, Department of Computer Sciences, University of Texas at Austin. This article is publicly available and is incorporated by reference herein. In some implementations, disk throttling can be done by measuring the latency of disk writes and decreasing the frequency as the latency starts to increase. Processes can be throttled, for example, by using any known CPU priority mechanism. In some implementations, an I/O queued by the prefetcher 114 can be cancelled by the cache 117 (e.g., by removing the I/O from the I/O queue), when a higher priority I/O for an overlapping region comes into the cache 117. In some implementations, the two I/Os can be merged into one I/O request encompassing more than one region. In some implementations, the size of a merged region can be limited (e.g., to control latency).

In some implementations, the trace processor 116 or 142 can break a trace up into one or more non-overlapping collections of events (e.g., based on whether the events have occurred within a specific time period or based on the number of events). Within each collection, the blocks can be sorted. Additionally, accesses to adjacent blocks within a collection can be aggregated (e.g., to generate larger requests). In some implementations, accesses to adjacent blocks within a collection can be aggregated subject to a request size limit.

In some implementations, the prefetcher 114 can determine its own location in the trace or which trace to use (e.g., based on a recent block access pattern of the virtual machine 106). For example, this determination can be done by looking at the last block or last two blocks accessed by the virtual machine 106 and seeing if any trace accesses the same two blocks in the same order. In some implementations, the prefetcher 114 can keep track of how far it has progressed through the traces (e.g., in persistent storage on the host device 102).

In some implementations, a trace can include data along with one or more block addresses. In some implementations, a trace can include references to one or more other traces. The amount of space that the trace occupies per virtual machine can be bounded. For example, in some implementations, only a trace associated with the currently running or currently prefetching or currently running and currently fetching versions of the VM is kept. In these implementations, older traces can be deleted. In some implementations, it is not necessary to fetch the entire trace. In these implementations, the trace can be fetched in chunks.

In some implementations (e.g., if the trace is large), only the first part of the trace (e.g., up to a certain length), is fetched. In some implementations, after a trace has been used to fetch data into the cache 126, that portion of the trace used to fetch data into the cache 126 can be deleted. In some implementations, when using a file system to store the cache 126, the trace file can be divided into multiple smaller local files. In these implementations, the ability to individually delete the smaller local files facilitates the freeing of space on the cache 126. Alternatively, in some implementations, a file system that supports freeing data inside of a file (e.g., Sun® ZFS), can be used to free space associated with the trace. In some implementations, if a collected trace is getting too large in size (e.g., with respect to user-selected, automatically configured, or implementation-defined limit), trace collection can be halted or older trace data can be deleted (e.g., either automatically or by user-selection).

In some implementations, the trace processor 116 or 142 can recognize a common sequence between multiple traces. In those implementations, a search can be optimized by keeping a hash table (e.g., that points to offsets in traces). For example, a hash function can be computed on portions of a new trace as it is scanned. The hash function can then be used to identify one or more candidate sections of other, previously processed traces. These candidate sections can be compared for commonalities, and any common region can be kept in a separate trace.

In some implementations, an entirely different virtual machine can be prefetched (e.g., based on a user's previous usage patterns or based on the previous usage patterns of one or more other users or groups of users). For example, the network resource 104 may log (e.g., based on cookies, sourceIP address, authentication, or another type of identifier), that users accessing a virtual machine A often end up also accessing a virtual machine B. Thus, when prefetcher 114 fetches virtual machine A, the prefetcher can also fetch virtual machine B (e.g., either automatically or by user selection). In some implementations, the network resource 104 can maintain a list of suggested additional virtual machines associated with a particular virtual machine.

For example, a list of suggested additional virtual machines can be maintained in a well-known file in a directory of a particular virtual machine. When a user selects the particular virtual machine, the user can be presented with the list of suggested additional virtual machines. The user can then select one or more of the suggested additional virtual machines. Alternatively, the suggestions can be added and prefetched without user interaction. In some implementations, a host device 102 can report to the network resource 104 (e.g., by using HTTP POST to post a list and a log of usage), which virtual machines users of host device 102 subscribe to and use.

Figure 2A:
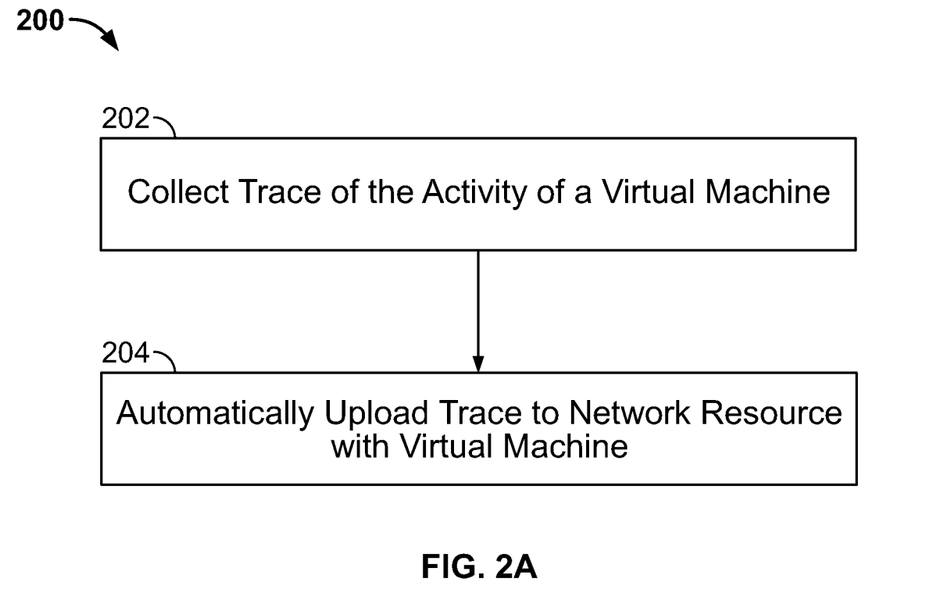
FIGS. 2A-2B are flow diagrams of example processes for trace-assisted prefetching of virtual machines.
Figure 2B:
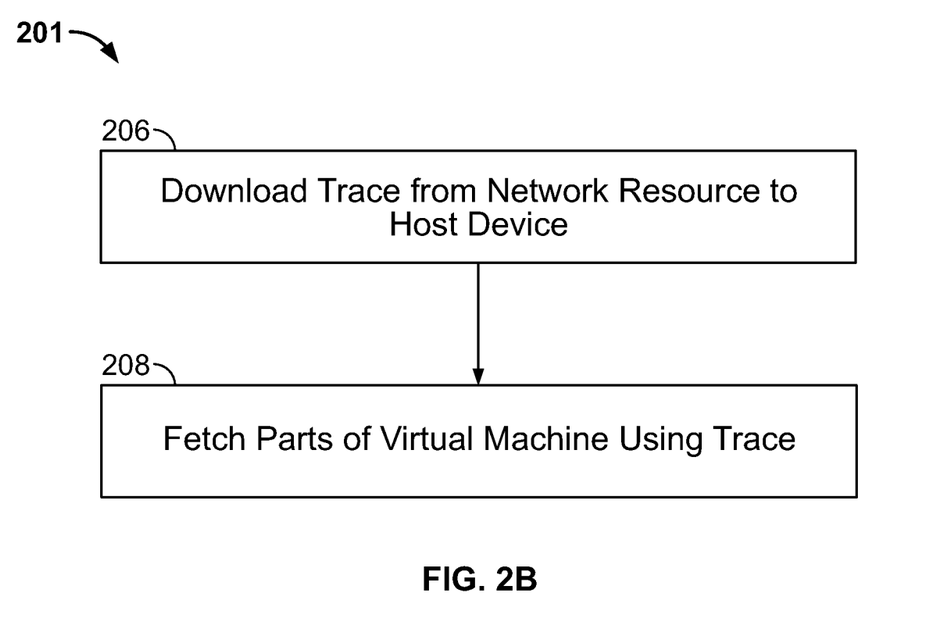

FIGS. 2A-2B are flow diagrams of example processes 200 and 201, respectively, for trace-assisted prefetching of virtual machines. In some implementations, the process 200 begins by collecting 202 an activity trace of a virtual machine from a first host device. In some implementations, the activity trace is collected 202 by a trace collector 120. The activity trace can be uploaded 204 (e.g., either automatically or upon user-selection), to a network resource 104. In some implementations, the activity trace can be automatically uploaded 204 by a trace uploader 118 coupled to a trace collector 120. In some implementations, an activity trace can be uploaded with a corresponding virtual machine.

In some implementations, the process 201 can download 206 the activity trace for a virtual machine from a network resource 104 to one or more host devices 102. In some implementations, the downloaded activity trace can be stored in memory on the host device 102. A processor coupled to memory on the host device 102 can use the trace to fetch 208 (e.g., automatically, based on trigger event), parts of the virtual machine from the network resource 104 as needed (e.g., preferentially).

Figure 3:
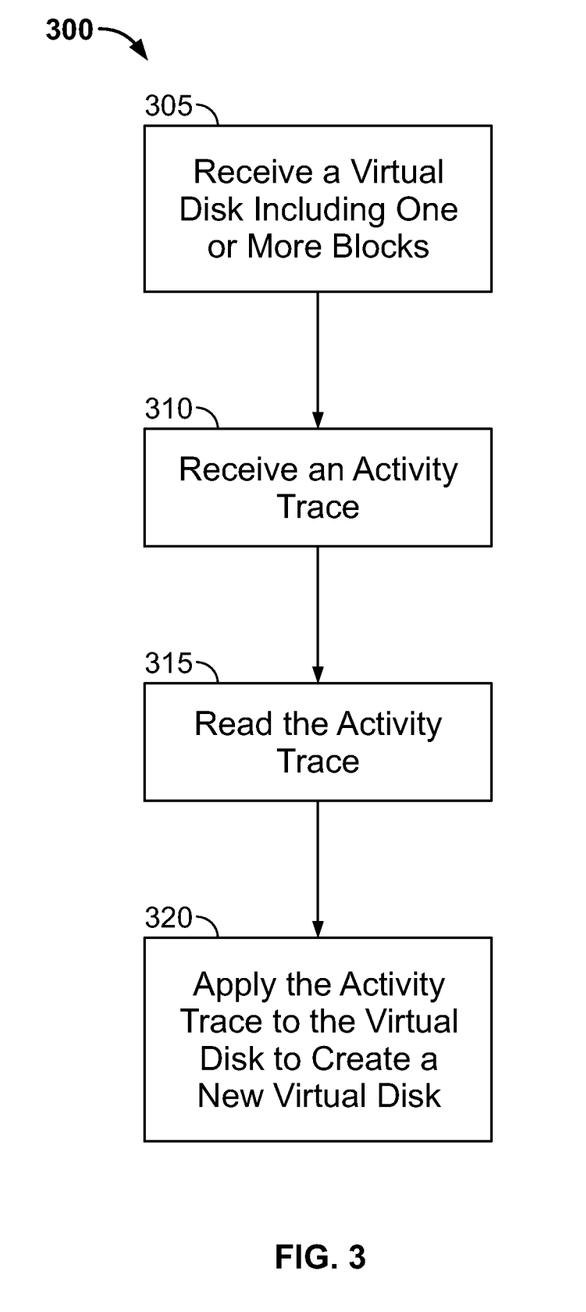
FIG. 3 is a flow diagram of an example process for applying an activity trace to a virtual disk.
Figure 4:
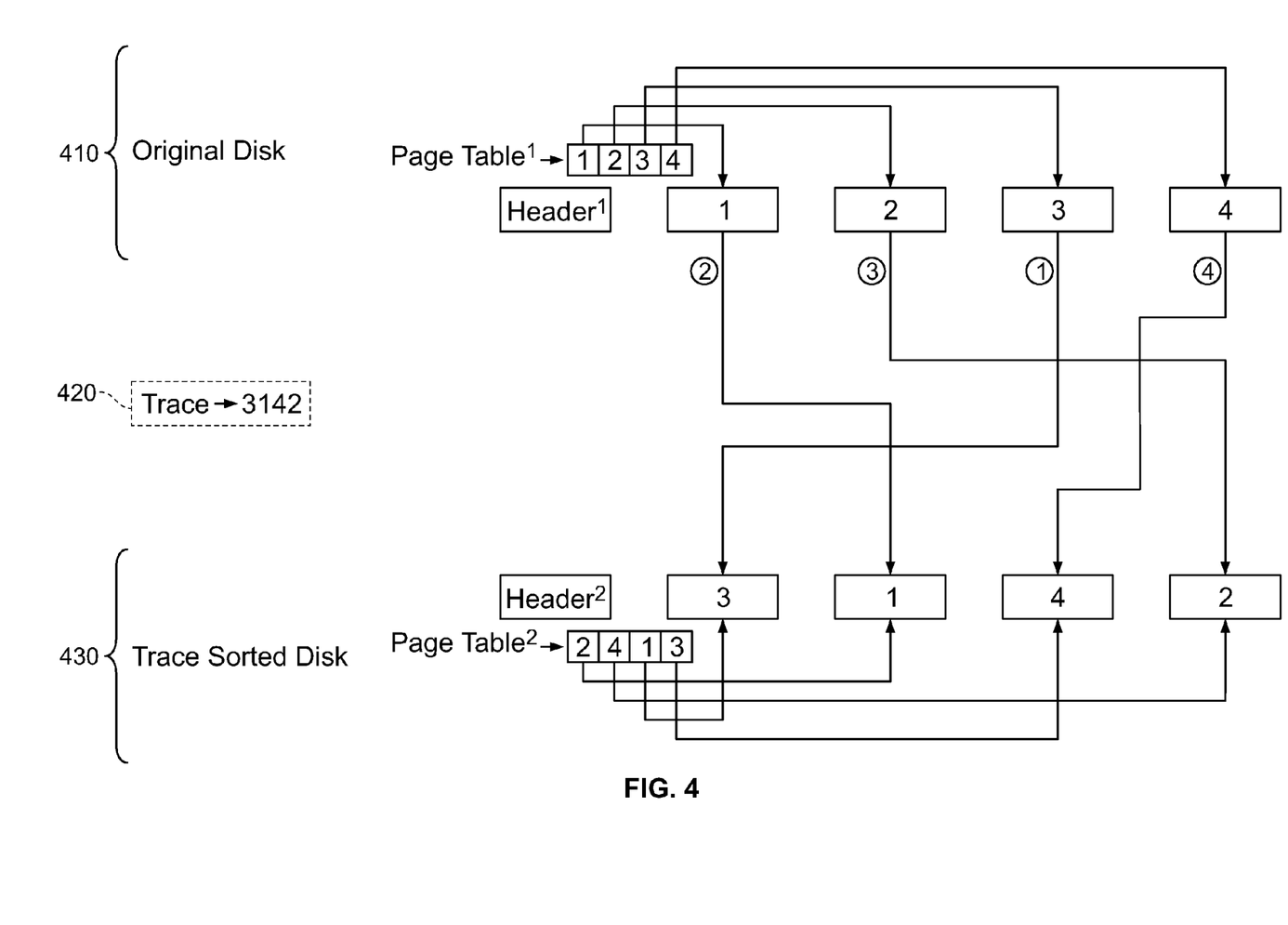
FIG. 4 is a block diagram of an example application of an activity trace to a virtual disk.

FIG. 3 is a flow diagram of example process 300 for applying an activity trace to a virtual disk. FIG. 4 is a block diagram showing an example application of an activity trace to a virtual disk.

As noted above, by reading a trace-sorted disk file sequentially (e.g., using TCP or HTTP), a client can fetch one or more blocks according to a prefetch order. A sequential approach to reading a disk file can be simpler to implement and expedite than alternatives that can include a random access pattern approach to reading a disk file.

In some implementations, the rearrangement of blocks in a virtual disk is made possible due to a "mapping" structure in the disk file. A mapping structure can be used to move the location of data blocks in the disk file without changing the contents of the virtual disk. In some implementations, the mapping structure is a page table capable of translating virtual disk block offsets to physical offsets in the disk file. The page table mapping can include one or more mappings of the virtual offset of a data block in the virtual disk to the physical offset of the data block in the physical disk file. In some implementations, the data structure can be a multi-level page table (e.g., VMware's VMDK or Microsoft's VHD®). When rearranging the physical disk, the physical offsets in the mapping structure are changed such that the physical disk continues to represent the same data blocks at the same corresponding virtual offsets. For purposes of explanation with respect to example process 300, the rearrangement of blocks inside a disk will be referred to as "trace sorting". To sort a disk file, the system first receives 305 one or more virtual disks. Each virtual disk can be in a first version including one or more data blocks in a first order.

FIG. 4 is a block diagram of an example application of an activity trace to a virtual disk. Referring to FIG. 4, the trace sorter 180 receives a virtual disk (e.g., "original disk" 410). Original disk 410 includes page table 1 and multiple data blocks 1, 2, 3, and 4, corresponding in order to page table 1. In this example, the original disk 410 physical block 1 holds virtual block 1, physical block 2 holds virtual block 2, physical block 3 holds virtual block 3, and physical block 4 holds virtual block 4.

After the trace sorter 180 has received original disk 410, the system receives 310 an activity trace 420. The original disk 410 is then sorted according to the activity trace 420. In some implementations, to sort the original disk 410, the activity trace 420 can be read 315 in the order that the activity trace 420 is received. In some implementations, to sort the original disk 410, the activity trace 420 is read 315 sequentially. As the activity trace 420 is read 315, the system creates a new disk file (e.g., "trace sorted disk" 430).

For example, as the virtual block order (e.g., 3,1,4,2), is read 315 from the activity trace 420, the trace processor reads the virtual blocks (e.g., 3,1,4,2), from the original disk 410 and appends the blocks in that order to the new trace sorted disk 430. In this example, the trace sorted disk 430 physical block 1 now holds virtual block 3, physical block 2 now holds virtual block 1, physical block 3 now holds virtual block 4, and physical block 4 now holds virtual block 2. Additionally, the trace processor updates the mapping structure of sorted disk 430 (e.g., the page table), to reflect the presence of the new virtual blocks. Thus, page table 1 from original disk 410 (e.g., physical blocks 1,2,3,4), become a potentially reordered page table 430 (e.g., physical blocks 2,4,1,3), to reflect the new physical offsets of the original set of data blocks.

Thus, the read order of the activity trace 420 is applied 320 to the original disk 410 (e.g., the first version of the virtual disk), to create a new trace sorted disk 430 (e.g., the second version of the virtual disk). The trace sorted version of the virtual disk includes the one or more data blocks from the first version of the virtual disk; however, the one or more data blocks are now rearranged (e.g., according to the activity trace 420), into a new second order.

In some implementations, if a block has already been inserted into the trace sorted disk 430, it is not inserted again.

In some implementations, if the activity trace 420 ends before all the data blocks have been copied from the original disk 410, the remaining data blocks of the original disk 410 can be appended to the trace sorted disk. In those implementations, the mapping structure (e.g., page table) can be updated in the manner described above (e.g., to reflect the new offset of the data blocks). In some implementations, updates to the mapping structure are done after multiple blocks have been appended to the file. In some implementations, these updates can be accomplished by tracking necessary changes to the mapping structure (e.g., in memory) and only writing out the necessary changes after multiple blocks have been appended.

In some implementations, the sorting of the disk file can be done at the client. In some implementations, the sorting of the disk file can be done at the server. The client receiving a trace sorted disk can choose to write a disk file to local storage with a new sort order. For example, the client may choose to place adjacent virtual data blocks in adjacent physical blocks in a cache or in a virtual disk (e.g., such that the users of the virtual disk potentially experience higher sequential throughput). Creation of a new sort order at the client could be done in the same manner as noted herein above with respect to the application of an activity trace 420 to an original disk 410 to create a trace sorted disk 430.

One challenge with reorganizing data blocks in a virtual disk is maintaining the integrity of digitally signed virtual disks. For example, a signature needs to be maintained when a data block is signed by a first party and resorted by second different party. In some implementations, individual data blocks can be individually signed. In some implementations, signing the individual data blocks requires including the virtual address of the data block inside the signature (e.g., to protect against the swapping of blocks by attackers).

Metadata blocks, like page table blocks, can be assigned virtual addresses too to make sure they are secure against being swapped. In some implementations, a virtual address for a page table in a multi-level page table can be synthesized by concatenating the indexes of the entries in the parent page tables that must be traversed to reach the data block. In some implementations, the virtual address of the data block is not directly stored in the data block (e.g., when the virtual address can be computed by both the signer and verifier). In those implementations, the virtual address can be generated in RAM and prepended or appended to the block being signed. In some implementations, a page table can contain one or more additional page tables and/or one or more data blocks. In those implementations, each additional page table can also contain one or more additional page tables and/or data block. In some implementations, the virtual address can include an identifier that relates the block to the virtual disk, (e.g., such that block cannot be copied between disks signed by the same person). For example, the disk header may include a probabilistically unique x-bit random (e.g., 64-bit) number that is included in every virtual address.

In most implementations, the mapping structures (e.g., page tables) can be signed to prevent attackers from removing blocks from the disk file. In implementations where the mapping structures (e.g., page tables) in a virtual disk cannot be literally signed, (e.g., the signature should not include the physical offsets of blocks within the disk file as the physical offset change), the format can specify that a position-independent representation corresponding to the page table is signed (e.g., in the place of signing the actual page table).

Figure 5:
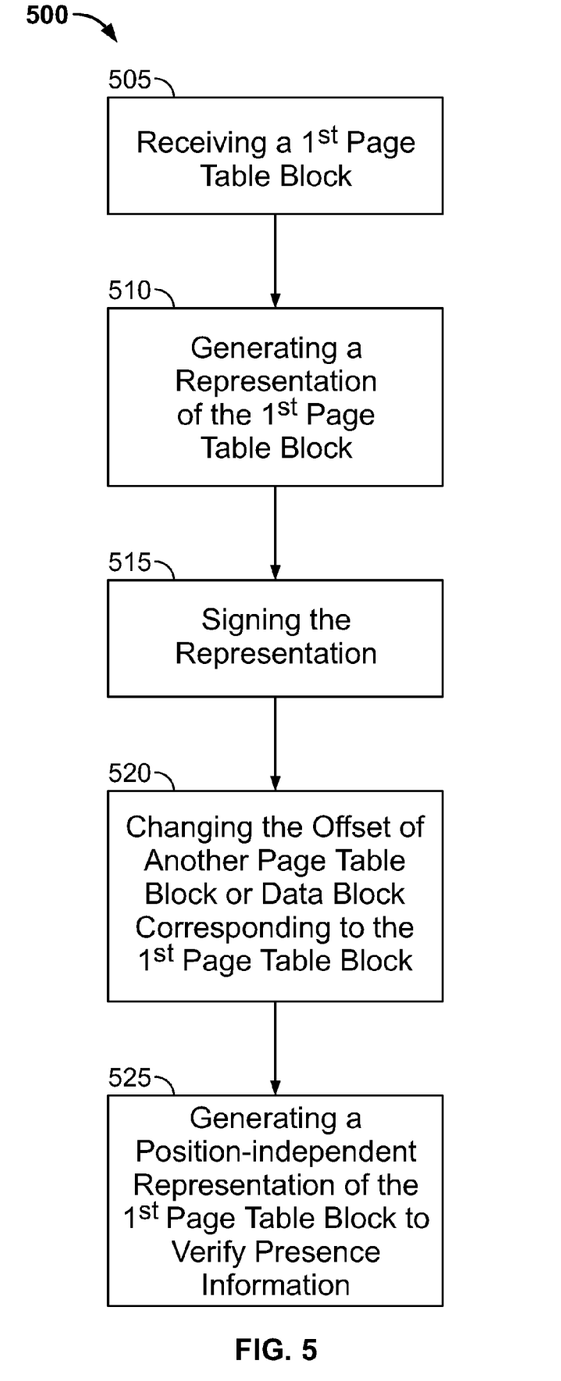
FIG. 5 is a flow diagram of an example process for verifying presence information using a signed representation of a page table block.

FIG. 5 is a flow diagram of an example process 500 for verifying presence information using a signed representation of a page table block. In order to sign the position-independent representation corresponding to a page table, the disk signer 160 receives 505 a virtual disk including a first page table block. The first page table block can correspond (e.g., point) to one or more other page table blocks or one or more data blocks. In some implementations, the one or more other page table blocks or the one or more data blocks can be in a first order. After receiving the first page table block, the disk signer 160 can generate 510 a position-independent representation (e.g., a bitmap), of the first page table block (e.g., 1,2,3,4,0).

In some implementations, the position-independent representation (e.g., the bitmap), corresponding to the first page table block does not include the physical offsets corresponding to each entry. In these implementations, the physical offsets can be removed while the related presence information (e.g., information indicative of whether the physical block is present in the file) is maintained. For example, for each entry in the first page table block, a bit in the bitmap can indicate whether the corresponding block (e.g., the block pointed to), is present in the file. Thus, the bitmap corresponding to the first page table block can be position-independent with respect to the one or more data blocks or one or more other page table blocks.

The representation of the block corresponding to the first page table block, including the position-independent representation of the page table block, is signed 515 (e.g., generating a signature). In some implementations, signing the representation includes generating a signature for the first page table block. In some implementations, a signature can be generated using a digital signature algorithm (e.g., NIST, DSA, HMAC-SHA1, RSA signing). In some implementations, the digital signature algorithm can include a verification algorithm. In some implementations, generating a signature can include calculating a cryptographic hash (e.g., SHA-1, MD5), on a position-independent representation. In some implementations, a position-independent representation can be signed by disk signer 160. In some implementations, disk signer 160 can be located on a host device 102. In some implementations, disk signer 160 can be located on a network resource 104.

In some implementations, each of the one or more other page table blocks can have a corresponding bitmap which can be individually signed. In some implementations, each of the one or more data blocks can be individually signed. In some implementations, each page table block has a corresponding virtual address, and a signature for the page table block can include the virtual address for the page table block inside the signature. In some implementations, each data block can have a corresponding virtual address, and a signature for a data block includes the virtual address for the data block inside the signature. In those implementations, the signature can be written into the virtual disk file. After the bitmap is signed, the offset of one or more page table blocks or data blocks in the original page table block can be changed 520 to reflect a newly ordered first page table block (e.g., 2,4,1,3 as shown in FIG. 4). In some implementations, the signature can be co-located in the block being signed. In some implementations, the signature can be placed in a page table entry that points to the block being signed.

In some implementations, to verify the integrity or presence information for the first page table block, the verifier 190 can receive a first page table block and a signature for the first page table block. The verifier 190 can then generate 525 a position-independent representation of the first page table block and pass the position-independent representation to a verification algorithm for the digital signature algorithm (e.g., to verify the integrity and authenticity of the data). For example, the verifier 190 can use the signature and the generated position independent representation to verify the integrity of the first page table block. The first page table block can include presence information with respect to one or more other page table blocks or one or more data blocks in the virtual disk, pointed to by the first page table block, and in the new order.

In some implementations, to verify the authenticity and integrity of the data, the digital signature algorithm can calculate a cryptographic hash of the position-independent representation. The digital signature algorithm can then verify that the cryptographic hash matches another cryptographic hash (e.g., one signed by the disk signer 160). In some implementations, the position-independent representation can be signed and saved (e.g., written into the virtual disk file). The position-independent representation can be saved either before or after it is signed. In some implementations, the position-independent representation can be saved without being signed. In those implementations, the virtual disk can be considered authenticated if the in-file position-independent representation and a separately generated position-independent representation match.

In some implementations, representations of page table blocks other than a bitmap are possible. For example, instead of a single bit for each entry in the bitmap, each entry can also include a cryptographic hash of the representation of the block being pointed to by page table. Representations should be invariant (e.g., position independent), with respect to the trace sorting method described above. Additionally, representations should be indicative of whether data blocks are present on a virtual disk (e.g., to protect against the deletion of blocks by malicious parties). In some implementations, representations are not explicitly stored in the trace sorted disk (e.g., when the representation can be computed by both the signer and verifier).

In some implementations, signing page table blocks and data blocks does not require a digital signature at the end of every block. An indirect signature can be made through a Merkle tree or similar data structure. In implementations using a Merkle tree, the Merkle tree needs to be constructed over the virtual blocks, which are invariant to reordering, rather than on the physical blocks. For example, the hash of the position-independent representation of the corresponding block can be placed in the page table alongside the pointer (e.g., the physical offset), to the corresponding block.

Figure 6A:
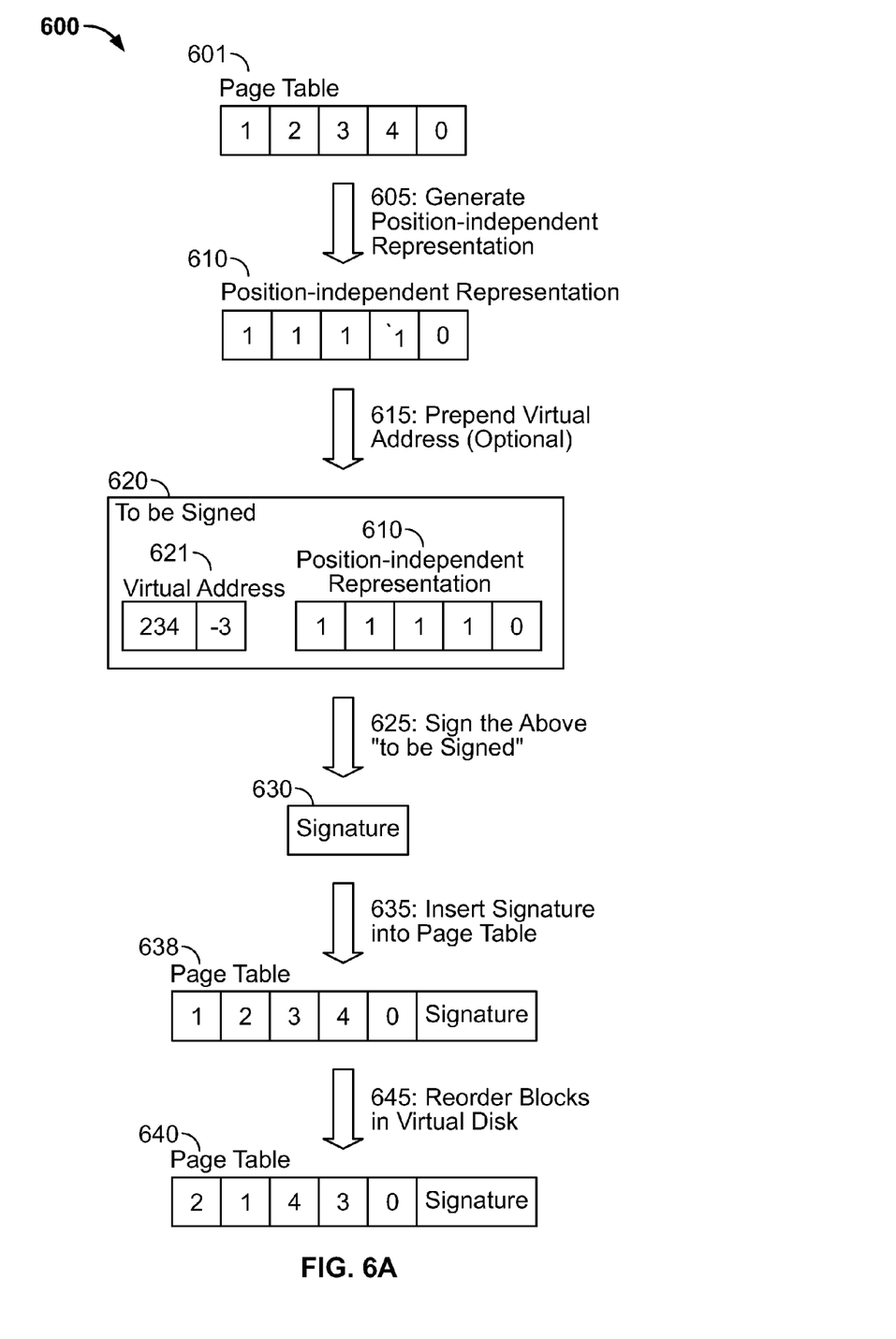
FIGS. 6A and 6B are a continuous flow diagram of an example process for generating, verifying, and reorganizing a signed disk.
Figure 6B:
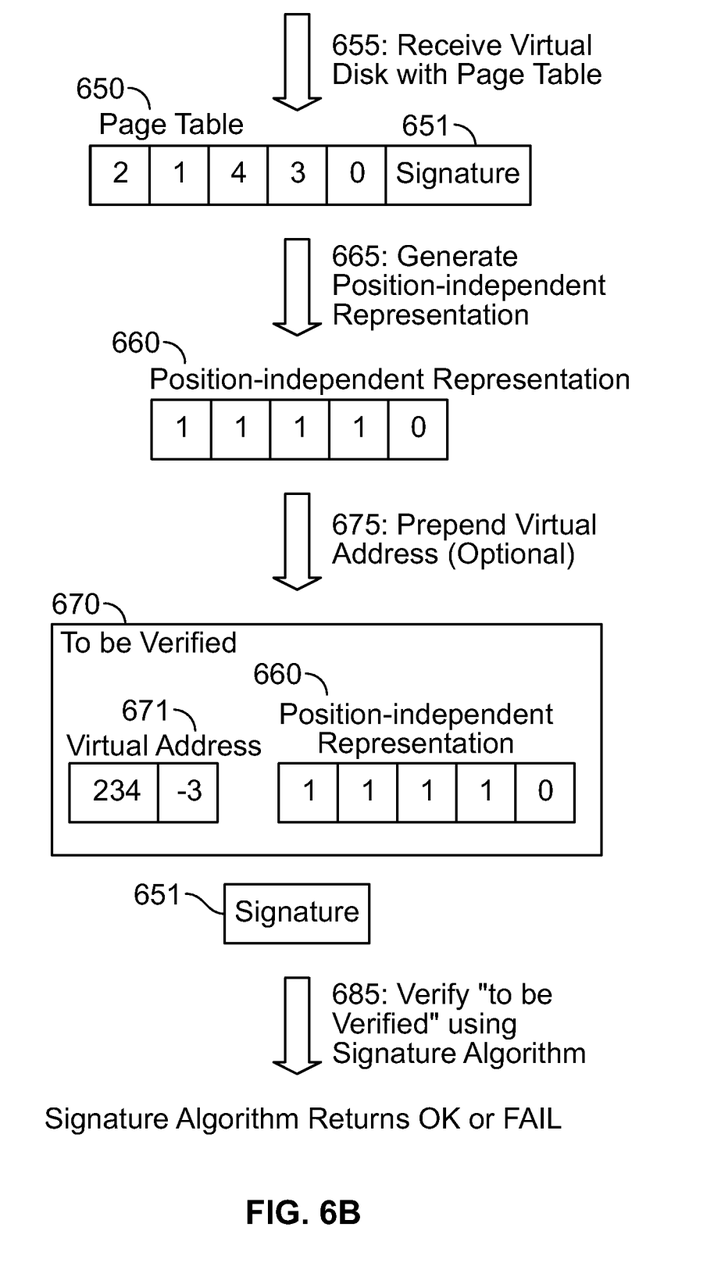

FIGS. 6A and 6B are a continuous flow diagram of an example process 600 for generating, verifying, and reorganizing a signed disk. The process begins when the disk signer 160 reads the page table block 601 from a virtual disk. In this example, the page table block 601 contains physical offsets to a block present in the file or zeros when a block is not present in the file. The signer generates 605 the position-independent representation 610 from the page table block 601. For example, the disk signer 160 can examine and convert entries which point to a block in the file to ones and entries which do not point to a block in the file to zeroes. In some implementations, the disk signer 160 can then prepend 615 (e.g., in memory), a virtual address 621 (e.g., including a probabilistically unique disk ID and virtual block offset), to the position-independent representation 610 to generate the "to be signed" buffer 620. The disk signer 160 can sign 625 the "to be signed" buffer 620 to generate signature 630 (e.g., by using NIST's digital signature algorithm).

The key management for the signature can be handled using standard key management techniques. For example, the disk signer 160 can have a private key, a public key, and a certificate. The certificate and public key can appear in the disk file or alongside the disk file when the disk file is published. The certificate can be signed by a well-known trusted party (e.g., Verisign®). In some implementations, the disk signer 160 inserts 635 the signature 630 into the page table block 601 to generate a modified page table 638 containing the signature field filled out with signature 630.

In some implementations, a trace sorter 180 can then reorder 645 the blocks in the disk file (e.g., by trace sorting the disk), including page table 638. This reordering can leave the signatures untouched, and can result in page table 640, which contains the virtual blocks at offsets different from those in the page table 601. In implementations where the disk ID is used as part of the virtual address, any new trace-sorted disk can have the same disk ID as the original virtual disk (e.g., to avoid failure of the signature verification process).

The verifier 190 (e.g., running on a different device such as host device 102), receives 655 the page table 650 with signature 651 (e.g., by downloading page table 650 from network resource 104). In some situations, the page table 650 may not be identical to the page table 640 when received by the verifier 190 (e.g., when the page table 650 has been tampered with prior to receipt by the verifier 190).

After receiving the page table 650, the verifier 190 can take the page table 650 entries and generate 665 a position-independent representation 660 of the page table 650 (e.g., by using techniques described above). The verifier 190 can then generate the virtual address 671 of page table block 650 (e.g., using the algorithm used by the disk signer 160), and prepend 675 the virtual address 671 to generate the "to be verified" buffer 670. In some implementations, in addition to the signature 651, the disk signer 160 can use the "to be verified" buffer 670 to verify 685 the authenticity and integrity of the page table 650.

In some implementations, the key used to verify the authenticity and integrity of page table 650 is a public key embedded in a certificate associated with the virtual disk file. In some implementations, the key is a shared secret between the disk signer 160 and the verifier 190. In some implementations, the verifier 190 can make a binary determination (e.g., using NIST's digital signature algorithm). For example, the verifier 190 can indicate an OK if the signature matches the buffer 670 and fail if the signature does not match the buffer 670. In some implementations (e.g., using HMAC-SHA1), the signature algorithm will generate a signature value that can be compared to signature 651 for equality. In those implementations, if the two signatures are equal, then the block is OK (e.g., the block has integrity and authenticity), otherwise the block is not OK (e.g., the block has been transformed in a potentially dangerous way).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard, a pointing device, e.g., a mouse or a trackball, or a musical instrument including musical instrument data interface (MIDI) capabilities, e.g., a musical keyboard, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Additionally, the invention can be embodied in a purpose built device.

What is claimed is:

1. A method comprising:
   obtaining an activity trace for a virtual machine;
   obtaining a first version of a virtual disk that includes one or more virtual blocks in a first order, wherein a first page table block of the virtual disk that reflects the one or more virtual blocks in the first order has a digital signature that is constructed with a representation of the first page table block, the representation being independent with respect to how other virtual blocks of the one or more virtual blocks are positioned;
   applying the read order of the activity trace to the first version of the virtual disk to create a new version of the virtual disk that includes the one or more virtual blocks in a new order and updating the first page table block to reflect the new order by changing at least one offset of the one or more virtual blocks;
   wherein the new order dictates the order in which the updated first page table block and the one or more virtual blocks in the new version of the virtual disk are downloaded; and
   wherein the digital signature dictates the validity of the updated first page table block, and the digital signature is invariant between the first version of the virtual disk and the new version of the virtual disk.

2. A computer-program product tangibly embodied on a non-transitory computer-readable medium for storing instructions, which when executed by a processor, causes the processor to perform operations comprising:
   obtaining an activity trace for a virtual machine
   obtaining a first version of a virtual disk that includes one or more virtual blocks in a first order, wherein a first page table block of the virtual disk that reflects the one or more virtual blocks in the first order has a digital signature that is constructed with a representation of the first page table block, the representation being independent with respect to how other virtual blocks of the one or more virtual blocks are positioned;
   applying the read order of the activity trace to the first version of the virtual disk to create a new version of the virtual disk that includes the one or more virtual blocks in a new order and updating the first page table block to reflect the new order by changing at least one offset of the one or more virtual blocks;
   wherein the new order dictates the order in which the updated first page table block and the one or more virtual blocks in the new version of the virtual disk are downloaded; and
   wherein the digital signature dictates the validity of the updated first page table block, and the digital signature is invariant between the first version of the virtual disk and the new version of the virtual disk.

* * * * *